United States Patent [19]
Isfort

[11] Patent Number: 5,911,375
[45] Date of Patent: Jun. 15, 1999

[54] CHOPPER AGGREGATE

[75] Inventor: Heinrich Isfort, Duelmen, Germany

[73] Assignee: Claas KGaA, Harsewinkel, Germany

[21] Appl. No.: 08/984,570

[22] Filed: Dec. 3, 1997

[30] Foreign Application Priority Data

Dec. 18, 1996 [DE] Germany ............... 1 96 52 656

[51] Int. Cl.⁶ .................................. B02C 18/18
[52] U.S. Cl. ........................... 241/241; 241/287
[58] Field of Search .................... 241/222, 242, 241/239, 241, 286, 287

[56] References Cited

U.S. PATENT DOCUMENTS 5,096,132  3/1992  Rauch et al. ............... 241/241

*Primary Examiner*—Mark Rosenbaum
*Attorney, Agent, or Firm*—Michael J. Striker

[57] ABSTRACT

A chopper aggregate has a chopper drum provided with a plurality of knives, a countercutter bar arranged on a saddle, a discharge element, a bottom plate transiting into the discharge element and partially surrounding the chopper drum, a unit for supporting the countercutter bar adjustably relative to the chopper drum, a unit for adjustably supporting the bottom plate for changing its radial position relative to the chopper drum so as to follow a position change of the countercutter bar, the unit for adjustably supporting the bottom plate being formed so that the bottom plate is adjustable at its both ends in dependence on an adjusting movement of the countercutter bar, radially relative to a peripheral circle of the chopper drum.

11 Claims, 3 Drawing Sheets

CHOPPER AGGREGATE

BACKGROUND OF THE INVENTION

The present invention relates to a chopper aggregate provided with an adjusting device.

Adjusting devices for chopper aggregates are known in the art. One of such devices is disclosed in the German patent document DE-OS 39 19 055. The chopper aggregate disclosed in this reference includes a chopper drum, a countercutter bar and a bottom plate under the chopper drum. During an adjustment of the countercutter bar, the bottom plate in the region of the countercutter bar can follow the position adjustments of the countercutter bar relative to the periphery of the chopper drum, depending on the sharpening works or adjustments. This construction has the disadvantage that the bottom plate can be adjustable at one side. The side of the bottom plate which is opposite to the countercutter bar is adjusted only to a smaller degree than the side facing the countercutter bar and can not be adjusted within a desired range. This results in undesired wedges of harvested product formed between the ground plate and the chopper drum, as well as in friction losses, heat generation and a reduced discharge power.

SUMMARY OF THE INVENTION

Accordingly, it is an object of present invention to provide a chopper aggregate with an adjusting device, which avoids the disadvantages of the prior art.

More particularly, it is an object of present invention to provide a chopper aggregate with an adjusting device, in which during an adjustment of the countercutter bar the bottom plate can be adapted to a new position of the countercutter bar both in the region facing toward the countercutter bar and in the region facing away from the countercutter bar.

In keeping with these objects and with others which will become apparent hereinafter, one feature of present invention resides, briefly stated, in a chopper aggregate with an adjusting device in which the bottom plate is adjustable at its both ends in dependence on the adjusting movement of the countercutter bar, radially relative to a peripheral circle of the chopper drum.

When the chopper aggregate is designed in accordance with the present invention, it avoids the disadvantages of the prior art and provides for highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
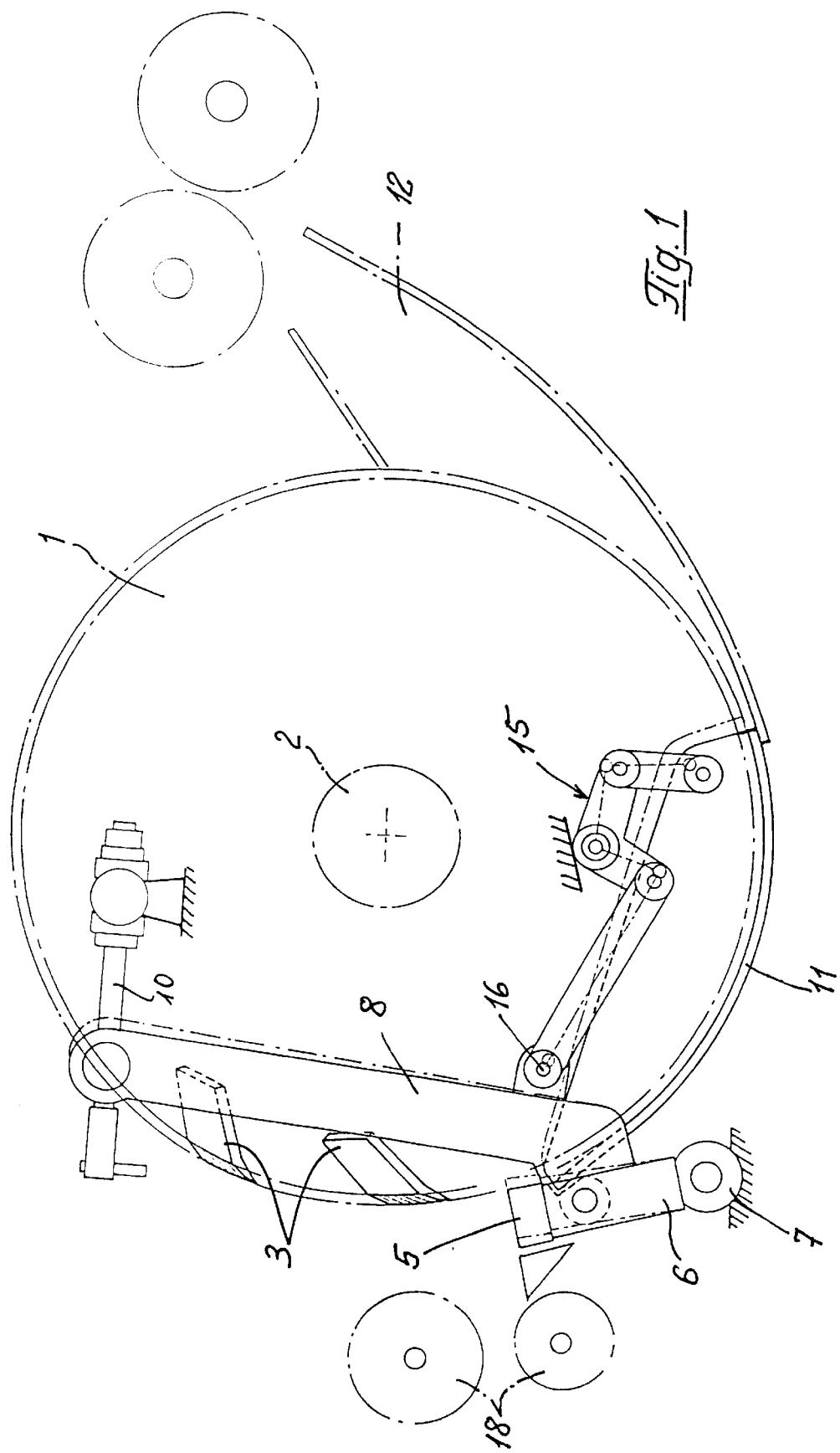
FIG. 1 is a schematic side view of an adjusting device of a chopper aggregate for a field chopper.
Figure 2:
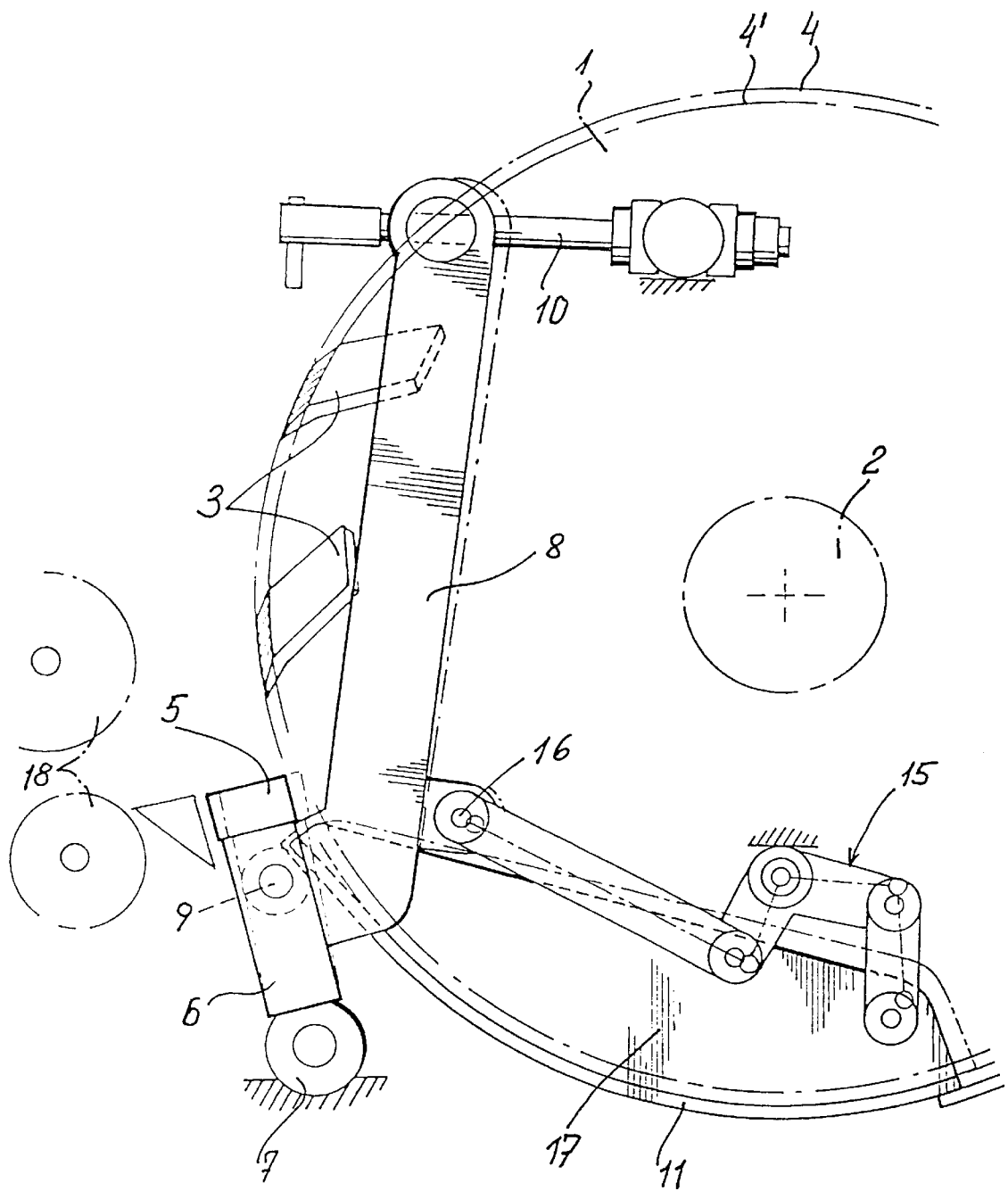
FIG. 2 is a view showing a part of the chopper aggregate of FIG. 1, on an enlarged scale.
Figure 3:
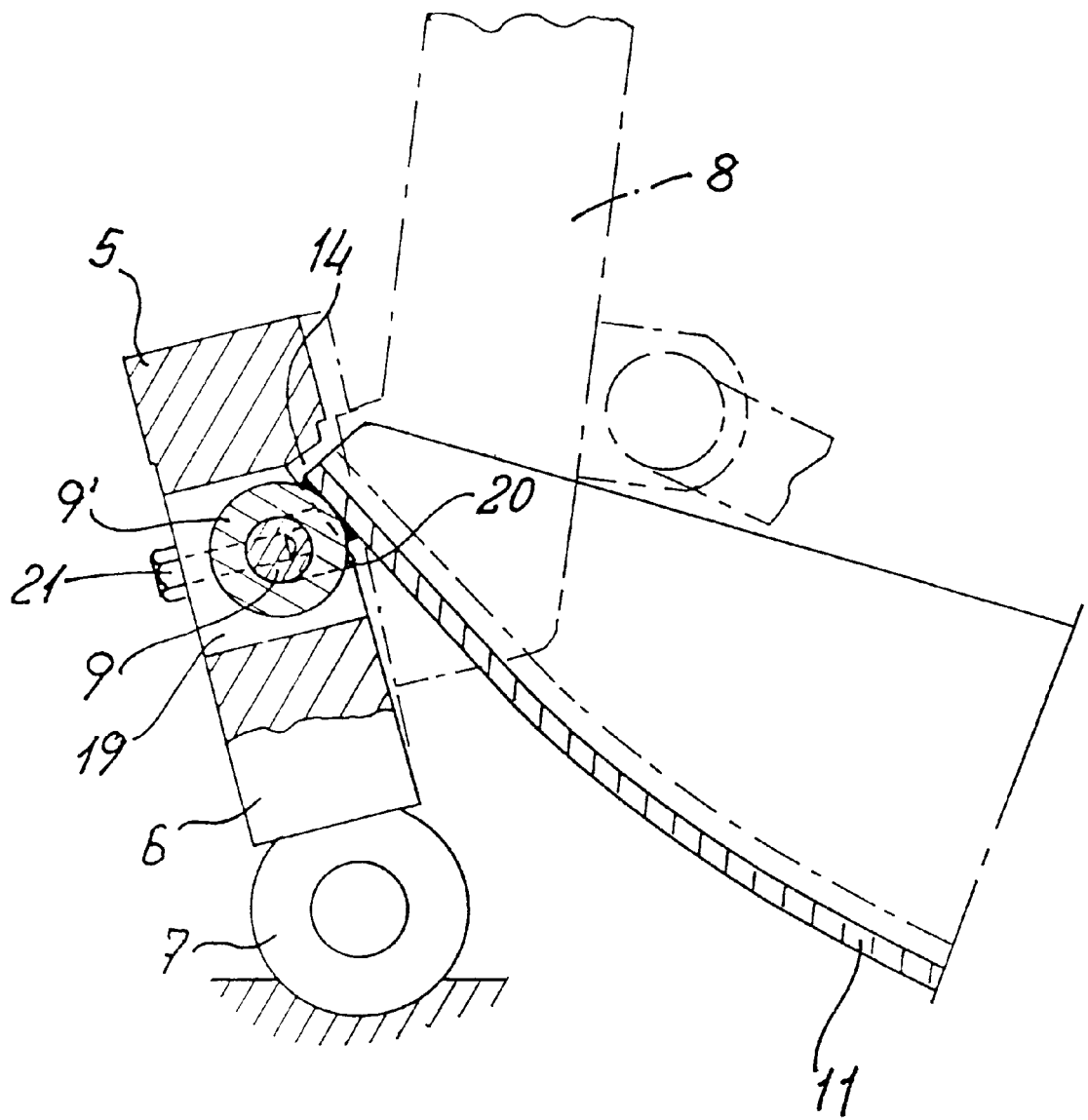
FIG. 3 is a view showing a side detail of the inventive chopper aggregate, also on an enlarged scale.

A chopper aggregate in accordance with the present invention is formed here as a field chopper. It has a chopper drum 1 which is rotatable about an axle 2 and provided with a plurality of knives 3. The chopper drum 1 and a countercutter bar 5 are associated with a pair of feed and compression rollers 18. The compression roller pair 18 transports the harvested product to be chopped to the countercutter bar 5, where it is engaged by the knives 3 of the rotatingly driven chopper drum 1, cut, accelerated, transported further, and thrown into a lower discharge chute 12. Under the action of the centrifugal forces which act during the acceleration and the transportation with the chopper drum 1 on the harvested product, the cut harvested product moves further along the surface of a bottom plate 11 which faces the chopper drum 1.

Reference numerals 4 and 4' identify possible circular paths of the knife tips before the first and the last possible knife sharpening. For maintaining the chopped product quality and also for using as little energy as possible for the cut, the knives 3 must be sharpened from time to time. The sharpening can reduce the drum diameter after several sharpening operations for example by 2 cm. In order to maintain a cutting action between the chopper knives 3 and the countercutter bar 5 despite the reduced drum diameter, it is necessary to adjust the countercutter bar 5 in correspondence with the rotary path of the chopper knives 3.

The countercutter bar 5 is located on a stable saddle or anvil 6 which extends through the width of the chopper drum 1 and outwardly beyond it to the side wall of the machine. The adjustment of the countercutter bar 5 can be performed for example in accordance with a predetermined post-sharpening process. In particular, it can be performed so that the saddle or anvil 6 is rotatably supported relative to an outer line of the chopper drum 1 parallel to an imaginary axis together with the countercutter bar 5 on legs 7 and is fixedly connected with a pair of adjustment levers 8 provided outside the drum region. The adjustment lever pair 8 on the other hand is connected with an adjustment element 10 formed for example as an adjusting screw, a hydraulic cylinder-piston unit, and the like.

The above mentioned bottom plate 11 is located under the chopper drum 1 at a small distance relative to the rotatable knives 3. It partially surrounds the drum, has the shape of a circular arc, and is formed as a trough. The bottom plate 11 merges into the lower discharge chute 12 of the chopper aggregate. The reduction of the diameter of the chopper drum 1 as a result of the sharpening not only increases the distances between the peripheral circle of the knives 3 relative to the countercutter bar 5, but also relative to the bottom plate 11. In order to eliminate the disadvantages which can result from the gap increase between the chopper drum 1 and the bottom plate 11, such as for example a product accumulation, from a wedge formation of the chopped product between the knives 3 of the chopper drum 1 and the bottom plate 11, and in order to prevent heat generation and difficulties in access, the bottom plate 11 can be also adjusted to the reduced drum diameter, in addition to the adjustment of the countercutter bar 5 after the knife sharpening.

For this purpose the bottom plate 11 on one end is supported by a rotary pin 9 in an opening 14 of the saddle or anvil 6, which extend over the saddle length. On the other end, it is held by a hinge rectangle 15 on bottom side parts 17 so as to be unchanged radially, preferably parallel to the chopper drum 11. Through the illustrated adjusting level kinematic system 15 it follows automatically the adjusting movement of the countercutter bar 5. In this manner the bottom plate 11 can be adjusted at both ends in dependence on the adjusting movement of the countercutter bar 5, radially relative to the peripheral circle of the chopper drum 11.

In order to avoid an additional lever linkage for the adjustment of the side of the bottom plate 11 which faces the countercutter bar 5, the pivot point of the pivot pin 9 is arranged in a transverse section region of the saddle or anvil 6 when the saddle 6 remains substantially horizontally. When the transverse section region of the saddle 6 is advanced, the pivot point of the pivot pin 9 can be arranged also between the saddle 6 and the peripheral circle of the chopper drum 1. For an arrangement of the pivot point of the rotary pin 9 and the transverse section region of the saddle 6, recesses 19 must be provided in the corresponding region of the saddle or anvil 6, to make possible an introduction of bearing sleeves 9' fixedly connected with the bottom plate 11. Furthermore, to allow the mounting of the pivot pin 9, a pivot pin mounting passage 20 must be provided in the side wall of the recess 19, when the bottom plate 11 must be removed for repair together with the bearing sleeve 9' and the pivot pin 9. The pivot pin 9 is secured during the operation of a mounting screw 21 against an unauthorized falling out. The bottom plate 11 can be movably connected at one or several locations with the saddle 6 in the above described manner and transmit the movements of the saddle 6 to the bottom plate 11.

In accordance with an alternative embodiment, the bearing sleeve 9' is not fixedly connected with the bottom plate 11, but instead rolls during movement of the bottom plate 11 around the pivot pin 9 over the rear side of the bottom plate 11. The floating bearing of the bottom plate 11 which is supported on the bearing sleeve 9' permits an especially easy adjustment of the position of the bottom plate 11. The combination of a one-end engaging, adjusting lever 15 and a floating, oppositely located bearing provides for a simple adjusting mechanical system. Moreover, the one-end floating bearing can elastically deviate the bottom plate 11 in the event of high loads and thereby reduce the wear of the bottom plate 11 as well as the vibrations. Instead of the bearing provided by the pivot pin, the bearing can be also formed by an insertion groove which is milled in the saddle 6 and has a sufficient width to perform the possible adjustment movements of the bottom plate 11. On the other hand, it secures the bottom plate from striking out in the peripheral circle of the chopper drum. The bearing can be secured for example by an additional clamping spring. The bottom plate 11 can end on a side which faces away from the saddle 6, and in particular where the tangential transition of the feed path of the harvested product into the lower discharge chute 12 is performed. The hinge rectangle 15 is articulately connected at the connecting point 16 to the foot-side end of the adjustment lever pair 8. For designing the hinge rectangle 15, also other shapes are possible which fall within the inventive idea.

It will be understood that each of the elements described above, or two or more together, may also find a useful application in other types of constructions differing from the types described above.

While the invention has been illustrated and described as embodied in a chopper blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chopper aggregate, comprising a chopper drum provided with a plurality of knives; a countercutter bar arranged on a saddle; a discharge element; a bottom plate transiting into said discharge element and partially surrounding said chopper drum. said bottom plate having two ends spaced from one another in a circumferential direction; means for supporting said countercutter bar adjustably relative to said chopper drum; means for adjustably supporting said bottom plate for changing its radial position relative to said chopper drum so as to follow a position change of said countercutter bar, said means for adjustably supporting said bottom plate being formed so that said bottom plate is adjustable in dependence on an adjusting movement of said countercutter bar, radially relative to a peripheral circle of said chopper drum simultaneously at both said ends to prevent formation of wedges of harvested product between said bottom plate and said chopper drum.

2. A chopper aggregate as defined in claim 1, wherein said discharge element is formed as a lower discharge chute.

3. A chopper aggregate as defined in claim 1, wherein said means for supporting said countercutter bar include a pivot pin and a bearing sleeve fixedly connected with said bottom plate and rotatably supported on said pivot pin so that an adjustment movement of said countercutter bar is transmitted to a front one of said ends of said bottom plate.

4. A chopper aggregate as defined in claim 3, wherein said pivot pin has a pivot point provided in a transverse section region of said saddle.

5. A chopper aggregate as defined in claim 3, wherein said pivot pin has a pivot point provided in a region between said saddle and said peripheral circle of said chopper drum.

6. A chopper aggregate as defined in claim 3, wherein said saddle has a recess, said pivot pin being supported in said recess of said saddle.

7. A chopper aggregate as defined in claim 6, wherein said saddle has a mounting passage located laterally of said recess for insertion of said pivot pin; and further comprising a mounting screw which fixes said pivot pin in said mounting passage.

8. A chopper aggregate as defined in claim 1, wherein one of said ends of said bottom plate is a front end which is floatingly supported on said saddle.

9. A chopper aggregate as defined in claim 1, wherein one of said ends of said bottom plate is a front end which is floatingly supported on said countercutter bar.

10. A chopper aggregate, comprising a chopper drum provided with a plurality of knives; a countercutter bar arranged on a saddle; a discharge element; a bottom plate transiting into said discharge element and partially surrounding said chopper drum; means for supporting said countercutter bar adjustably relative to said chopper drum; means for adjustably supporting said bottom plate for changing its radial position relative to said chopper drum so as to follow a position change of said countercutter bar, said means for adjustably supporting,said bottom plate being formed so that said bottom plate is adjustable in dependence on an adjusting movement of said countercutter bar, radially relative to a peripheral circle of said chopper drum, one of ends of said bottom plate being a front end which is floatingly supported on an element selected from the group consisting of said saddle and said counter cutter bar, the other of ends of said bottom plate being located in a transition region of said discharge element; a hinge rectangle to which said other end of said bottom plate is articulately connected; and an adjustment lever pair which is connected with said hinge rectangle and is operative for adjustment of said counter bar.

11. A chopper aggregate, comprising a chopper drum provided with a plurality of knives; a countercutter bar arranged on a saddle; a discharge element; a bottom plate transiting into said discharge element and partially surrounding said chopper drum, said bottom plate having two ends spaced from one another in a circumferential direction; means for supporting said countercutter bar adjustably relative to said chopper drum; means for adjustably supporting said bottom plate for changing its radial position relative to said chopper drum so as to follow a position change of said countercutter bar, said means for adjustably supporting said bottom plate being formed so that said bottom plate is adjustable in dependence on an adjusting movement of said countercutter bar, radially relative to a peripheral circle of said chopper drum simultaneously at both said ends so as to maintain a constant gap between the peripheral circle of said chopper drum and said bottom plate over a circumferential extension of said bottom plate between said ends, to prevent formation of wedges of harvested product between said bottom plate and said chopper drum.

* * * * *